(12) United States Patent
Wu (10) Patent No.: US 11,361,697 B2
(45) Date of Patent: Jun. 14, 2022

(54) DISPLAY PANEL, DETECTION METHOD AND DISPLAY DEVICE

(71) Applicants: HKC Corporation Limited, Guangdong (CN); Chongqing HKC Optoelectronics Technology Co., Ltd., Chongqing (CN)

(72) Inventor: Chuan Wu, Chongqing (CN)

( * ) Notice: Subject to any disclaimer, the term of this patent is extended or adjusted under 35 U.S.C. 154(b) by 0 days.

(21) Appl. No.: 17/272,602

(22) PCT Filed: Dec. 12, 2018

(86) PCT No.: PCT/CN2018/120608
§ 371 (c)(1),
(2) Date: Mar. 1, 2021

(87) PCT Pub. No.: WO2020/098036
PCT Pub. Date: May 22, 2020

(65) Prior Publication Data
US 2021/0280115 A1    Sep. 9, 2021

(30) Foreign Application Priority Data

Nov. 12, 2018 (CN) .......................... 201811338890.1

(51) Int. Cl.
*G09G 3/36* (2006.01)
*G09G 3/20* (2006.01)
*G09G 3/00* (2006.01)

(52) U.S. Cl.
CPC ................. *G09G 3/20* (2013.01); *G09G 3/00* (2013.01); *G09G 3/006* (2013.01); *G09G 2300/0443* (2013.01); *G09G 2310/0267* (2013.01); *G09G 2310/0275* (2013.01); *G09G 2330/12* (2013.01)

(58) Field of Classification Search
CPC ........... G09G 3/006; G09G 2310/0267; G09G 2310/0281; G09G 2300/0443;
(Continued)

(56) References Cited

U.S. PATENT DOCUMENTS

| 2009/0002295 A1 | 1/2009 | Hosaka | |
| 2009/0102753 A1* | 4/2009 | Yamashita | H01L 51/5228 345/55 |

(Continued)

FOREIGN PATENT DOCUMENTS

| CN | 101334979 A | 12/2008 |
| CN | 101364022 A | 2/2009 |

(Continued)

*Primary Examiner* — Dennis P Joseph
(74) *Attorney, Agent, or Firm* — Conley Rose, P. C.; Grant Rodolph (57) ABSTRACT

A display panel. The display panel includes a pixel array, a plurality of gate lines arranged in rows, and a plurality of data lines arranged in columns. The gate lines and the data lines are configured to intersect each other at right angles, respectively; each row of pixels is correspondingly connected to two of the gate lines, and any two of the gate lines are parallel to each other; every two columns of subpixels are correspondingly connected to one of the data lines, and any two of the data lines are parallel to each other; and any two of the gate lines arranged in adjacent rows are configured to present a predetermined length difference therebetween. By setting a predetermined length difference, the array detection for display panel is realized to ensure the production yield of the display panel.

15 Claims, 6 Drawing Sheets

(58) Field of Classification Search
CPC .. G09G 3/364; G09G 2330/12; G09G 3/3607; G09G 3/3611
See application file for complete search history.

(56) References Cited

U.S. PATENT DOCUMENTS

| | | |
|---|---|---|
| 2009/0273592 A1 | 11/2009 | Chien et al. |
| 2010/0066383 A1 | 3/2010 | Chung et al. |
| 2011/0148830 A1 | 6/2011 | Hsu et al. |
| 2015/0379947 A1* | 12/2015 | Sang ................ G02F 1/134309 349/37 |
| 2017/0154556 A1 | 6/2017 | Cao et al. |
| 2017/0309209 A1* | 10/2017 | Kenmotsu ............ G09G 3/3233 |
| 2019/0051718 A1* | 2/2019 | Zhang ................ G09G 3/3225 |
| 2021/0033937 A1 | 2/2021 | Wu et al. |

FOREIGN PATENT DOCUMENTS

| | | |
|---|---|---|
| CN | 202256947 U | 5/2012 |
| CN | 103487955 A | 1/2014 |
| CN | 103925934 A | 7/2014 |
| CN | 104122689 A | 10/2014 |
| CN | 104809970 A | 7/2015 |
| CN | 105759521 A | 7/2016 |
| CN | 205487263 U | 8/2016 |
| CN | 107967886 A | 4/2018 |
| CN | 108364567 A | 8/2018 |
| WO | 2004104981 A1 | 12/2004 |
| WO | 2008127713 A1 | 10/2008 |
| WO | 2016108122 A1 | 7/2016 |

\* cited by examiner

DISPLAY PANEL, DETECTION METHOD AND DISPLAY DEVICE

CROSS-REFERENCE TO RELATED APPLICATIONS

This application is the International Application No. PCT/CN2018/120608 for entry into US national phase with an international filing date of Dec. 12, 2018, which claims priority to Chinese Patent Application No. 201811338890.1, filed on Nov. 12, 2018, the contents of which are incorporated herein by reference.

TECHNICAL FIELD

The present application relates to the technical field of display panels, and in particular to a display panel, a detection method and a display device.

BACKGROUND

The statements here only provide background information related to the present application, and do not necessarily constitute prior art. At present, matrix display panels are most commonly used in display devices. The driving architecture of matrix display panels includes ordinary active driving architecture and half-source driving architecture. When using a half-source driving architecture, for high-definition (1366RGB*768) display panels, the number of data lines to be driven is 1366*3/2=2049, and the number of gate lines to be driven is 768*2=1536. The total number of data lines and gate lines is much less than that of an ordinary active driving architecture, as the number of data lines is much greater than the number of gate lines in the display panel with a half-source driving architecture, a large amount of plates can be saved, thereby reducing the manufacturing cost of the display panel.

However, due to the structural characteristics of the display panel with the half-source driving architecture, when performing array detection on the gate lines of the display panel, it is impossible to directly detect the short circuit or open circuit of the gate lines or the reference voltage line array, resulting in reduction in the production yield of the display panel.

SUMMARY

An objective of the present application is to provide a display panel, including but not limited to, solving the problem that the short circuit and open circuit of the gate line or the reference voltage line cannot be directly detected for the half-source driving architecture, resulting in reduction in the production yield of the display panel.

The technical solution adopted in an embodiment of the present application is that: the embodiment of the present application provides a display panel, including a pixel array, a plurality of gate lines arranged in rows, and a plurality of data lines arranged in columns, where the gate lines and the data lines are configured to intersect each other at right angles, respectively; each row of pixels is correspondingly connected to two of the gate lines, and any two of the gate lines are parallel to each other; every two columns of subpixels are correspondingly connected to one of the data lines, and any two of the data lines are parallel to each other; and any two of the gate lines arranged in adjacent rows are configured to present a predetermined length difference therebetween.

In an embodiment, a row spacing of two adjacent gate lines connected to a same row of pixels is set to be a first row spacing, a row spacing of two adjacent gate lines connected to different rows of pixels is set to be a second row spacing, and the first row spacing is greater than the second row spacing.

In an embodiment, a length of each of the gate lines arranged in odd-numbered rows is set to be a first length, a length of each of the gate lines arranged in even-numbered rows is set to be a second length, and the first length is set to be greater than the second length. In an embodiment, a length of each of the gate lines arranged in odd-numbered rows is set to be a first length, a length of each of the gate lines arranged in even-numbered rows is set to be a second length, and the first length is set to be smaller than the second length. In an embodiment, a portion of each of the gate lines is set to be a first portion, the first portion is connected to each row of pixels, an end of each of the gate lines configured for array detection is set to be a second portion, a length of the first portion of each of the gate lines arranged in even-numbered rows is equal to that of the first portion of each of the gate lines arranged in odd-numbered rows, and the second portion of each of the gate lines arranged in odd-numbered rows is set to extend by a first distance.

In an embodiment, the second portion of each of the gate lines arranged in odd-numbered rows is extended by a first distance, before array detection, ends of extended gate lines arranged in odd-numbered rows are set to be in a sequentially connected state; and after the array detection is completed, connected ends of the gate lines arranged in odd-numbered rows are set to be in a disconnected state.

In an embodiment, a portion of each of the gate lines is set to be a first portion, the first portion is connected to each row of pixels, an end of each of the gate lines configured for array detection is set to be a second portion, a length of the first portion of each of the gate lines arranged in even-numbered rows is equal to that of the first portion of each of the gate lines arranged in odd-numbered rows, and the second portion of each of the gate lines arranged in even-numbered rows is set to extend by a second distance.

In an embodiment, the second portion of each of gate lines arranged in even-numbered rows is extended by a second distance, before array detection, ends of extended gate lines arranged in even-numbered rows are set to be in a sequentially connected state; and after the array detection is completed, connected ends of the gate lines arranged in even-numbered rows are set to be in a disconnected state.

In an embodiment, ends of all of the gate lines arranged in odd-numbered rows are connected in sequence one by one, or ends of all of the gate lines arranged in even-numbered rows are connected in sequence one by one.

In an embodiment, the display panel further includes a plurality of first reference voltage lines and a second reference voltage line, each of the first reference voltage lines is arranged between two gate lines corresponding to each row of pixels, and each row of pixels is correspondingly connected to one of the first reference voltage lines; an end of any one of the first reference voltage lines and any one of the gate lines are parallel to each other; an end of any one of the first reference voltage lines is connected to the corresponding second reference voltage line; and the second reference voltage line is perpendicular to the first reference voltage lines, and is arranged on a side of the pixel array.

In an embodiment, an end of each of the gate lines arranged in odd-numbered rows is extended by a predetermined distance and connected to the corresponding second reference voltage line.

In an embodiment, before array detection, the gate lines arranged in odd-numbered rows and the second reference voltage line are set to be in a connected state; and after the array detection is completed, the gate lines arranged in odd-numbered rows and the second reference voltage line are set to be in a disconnected state.

In an embodiment, an end of each of the gate lines arranged in even-numbered rows is extended by a predetermined distance and connected to the corresponding second reference voltage line.

In an embodiment, before array detection, the gate lines arranged in even-numbered rows and the second reference voltage line are set to be in a connected state; and after the array detection is completed, the gate lines arranged in even-numbered rows and the second reference voltage line is set to be in a disconnected state.

Another objective of the present application is to provide a detection method for detecting the above-mentioned display panel, including: outputting, by a drive circuit, a first electrical signal to a first end of a gate line; obtaining, by a detection circuit, a second electrical signal output from a second end of the gate line, where any two of the gate lines arranged in adjacent rows are configured to present a predetermined length difference therebetween; and determining whether the gate line is faulty according to the first electrical signal and the second electrical signal.

In an embodiment, before array detection, second ends of the gate lines arranged in even-numbered rows are set to be in a connected state, and second ends of the gate lines arranged in odd-numbered rows are set to be in a normal operating wiring state, or the second ends of the gate lines arranged in odd-numbered rows are set to be in a connected state, and the second ends of the gate lines arranged in even-numbered rows are set to be in a normal operating wiring state, such that a resistance of each of the gate lines arranged in even-numbered rows and that of each of the gate lines arranged in odd-numbered rows is different; during array detection, the resistance of each of the gate lines arranged in odd-numbered rows and that of each of the gate lines arranged in even-numbered rows are respectively obtained according to the first electrical signal and the second electrical signal, and a fault of the gate lines arranged in odd-numbered rows and that of the gate lines arranged in even-numbered rows are determined according to the resistances.

In an embodiment, when second ends of the gate lines arranged in odd-numbered rows are in a connected state, the second ends of the gate lines are scanned to detect terminal voltages and currents of the gate lines arranged in even-numbered rows and those of the gate lines arranged in odd-numbered rows respectively, a path condition of each of the gate lines arranged in even-numbered rows is detected according to the terminal voltage and the current of each of the gate lines arranged in even-numbered rows, and a path condition of each of the gate lines arranged in odd-numbered rows is detected according to the terminal voltage and the current of each of the gate lines arranged in odd-numbered rows.

In an embodiment, the detection method further includes: before fault detection for gate lines, connecting ends of the gate lines arranged in odd-numbered rows in sequence one by one; and after the fault detection for gate lines is completed, disconnecting the ends of the gate lines arranged in odd-numbered rows; or before fault detection for gate lines, connecting ends of the gate lines arranged in even-numbered rows in sequence one by one; and after the fault detection for gate lines is completed, disconnecting the ends of the gate lines arranged in even-numbered rows.

In an embodiment, the detection method further includes: before fault detection for gate lines and first reference voltage lines, extending an end of each of the gate lines arranged in odd-numbered rows by a predetermined distance and connecting the same to a corresponding second reference voltage line; and after the fault detection for gate lines and first reference voltage lines is completed, disconnecting the ends of the gate lines arranged in odd-numbered rows from the corresponding second reference voltage line; or before fault detection for gate lines and first reference voltage lines, extending an end of each of the gate lines arranged in even-numbered rows by a predetermined distance and connecting the same to a corresponding second reference voltage line; and after the fault detection for gate lines and first reference voltage lines is completed, disconnecting the ends of the gate lines arranged in even-numbered rows from the corresponding second reference voltage line.

Yet another objective of the present application is to provide a display device, including the above-mentioned display panel; the display panel including a pixel array, a plurality of gate lines arranged in rows, and a plurality of data lines arranged in columns, where the gate lines and the data lines are configured to intersect each other at right angles, respectively; each row of pixels is correspondingly connected to two of the gate lines, and any two of the gate lines are parallel to each other; every two columns of subpixels are correspondingly connected to one of the data lines, and any two of the data lines are parallel to each other; and any two of the gate lines arranged in adjacent rows are configured to present a predetermined length difference therebetween.

The embodiments of the present application provide a display panel, a detection method and a display device, the gate lines in the odd-numbered rows and the gate lines in the even-numbered rows of the display panel are set to be of different lengths, such that when performing array detection on the display panel, it is possible to detect whether the wiring inside the display panel is short-circuited or open according to the voltage and resistance difference between the gate lines in the even-numbered rows and the gate lines in the odd-numbered rows.

DESCRIPTION OF EMBODIMENTS

In order to make the objectives, technical solutions, and advantages of the present application clearer, the present application will be further described in detail in the following with reference to the accompanying drawings and embodiments. It should be understood that the specific embodiments described herein are intended to explain the present disclosure, but are not intended to limit the present application.

It should be noted that when a component is referred to as being "fixed to/on" or "arranged/disposed on/in/at" another component, it may be directly or indirectly located on/in the other component. When a component is referred to as being "connected to" another component, it may be directly or indirectly connected to the other component. The orientation or positional relationship indicated by terms, such as "up", "down", "left", "right", or the like, is based on the orientation or positional relationship shown in the drawings, is only for convenience of description and do not indicate or imply that the device or element referred to must have a specific orientation or be constructed and operated in a specific orientation, and therefore cannot be understood as a limitation of the present application. For those of ordinary skill in the art, the specific meaning of the above terms can be understood according to specific conditions. The terms "first" and "second" are only used for convenience of description, and cannot be understood as indicating or implying relative importance or implicitly indicating the number of technical features. The meaning of "a/the plurality of" is two or more, unless specifically defined otherwise.

In order to illustrate the technical solutions described in the present application, detailed descriptions are given below combination with specific drawings and embodiments.

The display panel with the half-source driving architecture provided by the embodiments of the present application doubles the gate lines and reduces the data lines by half. Each row of pixels corresponds to two gate lines, and each data line corresponds to two columns of subpixels.

Figure 1:
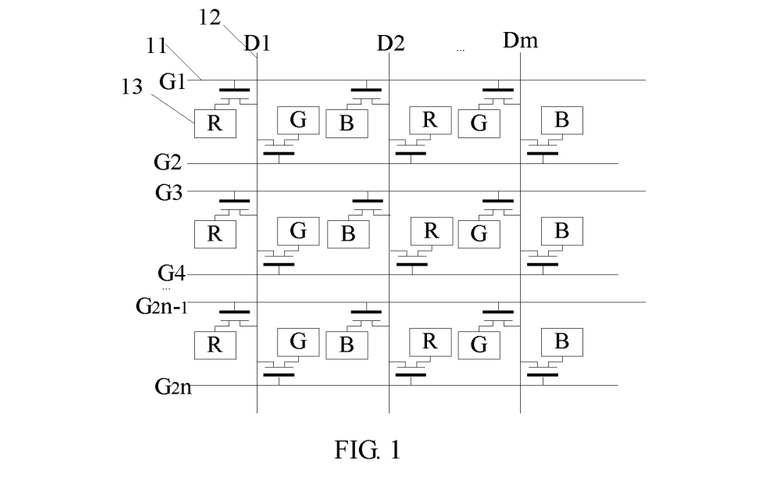
FIG. 1 is a schematic diagram showing a structure of a display panel according to an embodiment of the present application.

As shown in FIG. 1, it is a schematic diagram showing a structure of a display panel according to an embodiment of the present application. For convenience of description, only the portions related to the embodiment of the present application are shown.

As shown in the figure, the display panel includes a pixel array, a plurality of gate lines arranged in rows 11 and a plurality of data lines arranged in columns 12, the gate lines and the data lines intersect each other at right angles, respectively; each pixel includes three subpixels 13 arranged in sequence along the row direction.

Each row of pixels is correspondingly connected to two gate lines 11, and any two gate lines 11 are parallel to each other.

Every two columns of subpixels 13 are correspondingly connected to a data line 12, and any two data lines 12 are parallel to each other. As shown in the figure, 2n gate lines 11 correspond to n rows of pixels, and m data lines 12 correspond to 2m columns of subpixels 13. There is a predetermined length difference between any two of the gate lines arranged in adjacent rows; the predetermined lengths may be set according to the actual needs of the specific size of the display panel, and the predetermined length difference is set to make the display panel in a detection state, and to realize the array detection for display panel. Where, the row spacing of two adjacent gate lines connected to the same row of pixels is the first row spacing, the row spacing of two adjacent gate lines connected to different rows of pixels is the second row spacing, and the first row spacing is greater than the second row spacing.

In an embodiment, the length of each of the gate lines arranged in odd-numbered rows is set to be a first length; the length of each of the gate lines arranged in even-numbered rows is set to be a second length; and the first length is set to be greater than the second length.

In an embodiment, the length of each of the gate lines arranged in odd-numbered rows is set to be a first length; the length of each of the gate lines arranged in even-numbered rows is set to be a second length; and the first length is set to be smaller than the second length.

In an embodiment, the lengths of all of the gate lines arranged in odd-numbered rows may be different from each other, the lengths of all of the gate lines arranged in even-numbered rows may be different from each other, and the lengths of the gate lines arranged in even-numbered rows are not equal to those of the gate lines arranged in odd-numbered rows. It is also possible to set the lengths of the gate lines arranged in odd-numbered rows to be greater than those of the gate lines arranged in even-numbered rows, or to set the lengths of the gate lines arranged in even-numbered rows to be greater than those of the gate lines arranged in odd-numbered rows.

In this embodiment, the number of rows and the number of columns of the pixel array may be set according to specific needs, and the size of the pixel array is not particularly limited.

In an embodiment, the display panel may include M rows and N columns of pixels, that is, the display panel includes a pixel array with M×N pixels. Each column of pixels includes a plurality of groups of subpixels, and each group of subpixels includes a first-color subpixel, a second-color subpixel, and a third-color subpixel arranged in sequence, where N≥M≥1, and M and N are all positive integers.

In an embodiment, in the above-mentioned pixel array, the subpixels in the same column have a same color, and the subpixels in adjacent columns have different colors.

In an embodiment, the first-color subpixel, the second-color subpixel, and the third-color subpixel are any one of a red subpixel, a green subpixel, a blue subpixel, and a white subpixel, respectively, and colors of the first-color subpixel, the second-color subpixel, and the third-color subpixel are different from each other.

This embodiment adopts a display panel based on a half-source driving architecture. Every two gate lines are correspondingly connected to a row of subpixels. The first spacing between two gate lines connected to the same row of pixels is not equal to the second spacing between two adjacent gate lines connected to different rows of subpixels, such that the array detection for gate lines cannot be performed with a uniform pulse signal; by setting the gate lines to be of unequal lengths, the gate lines used for detection are set according to predetermined lengths to meet the conditions for array detection.

In an embodiment, for each gate line of the display panel, the portion connected to a row of pixels is a first portion, and the end used for array detection is a second portion. The length of the first portion of each of the gate lines arranged in odd-numbered rows is equal to that of the first portion of each of the gate lines arranged in even-numbered rows. The second portion of each of the gate lines arranged in odd-numbered rows is extended by a first distance, or the second portion of each of the gate lines arranged in even-numbered rows is extended by a second distance. During array detection, the gate line arranged in odd-numbered row and the gate line arranged in even-numbered row are distinguished since gate lines of different lengths have different resistances.

Figure 2:
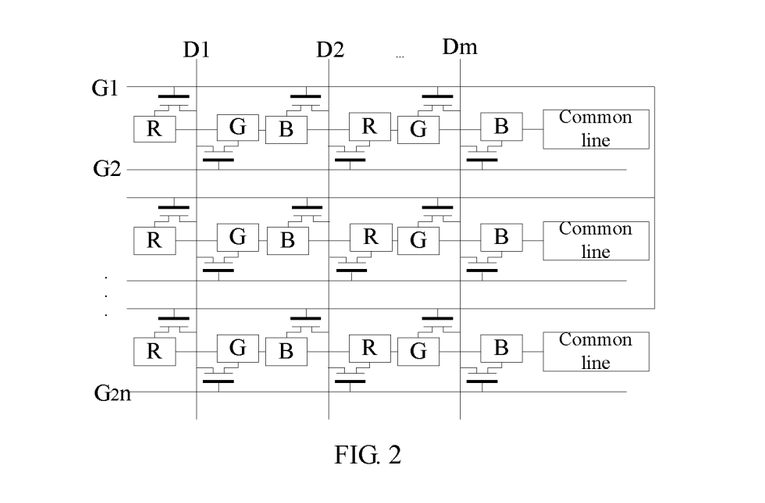
FIG. 2 is a schematic diagram showing a specific structure of a display panel according to an embodiment of the present application.
Figure 3:
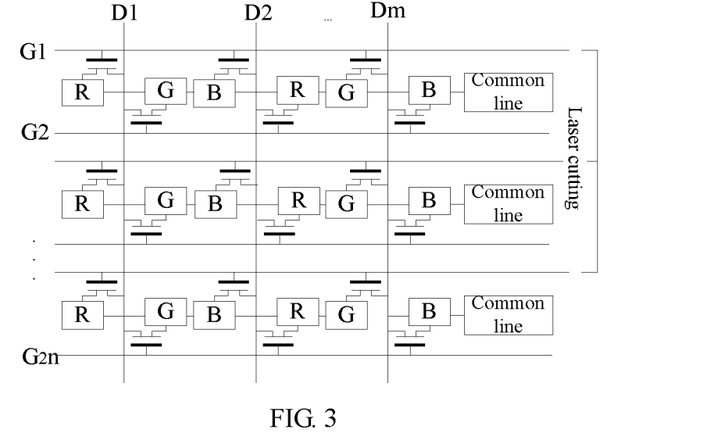
FIG. 3 is a schematic diagram showing a specific structure of a display panel according to an embodiment of the present application.

In an embodiment, the second portion of each of the gate lines arranged in odd-numbered rows is extended by a first distance. Before array detection, the ends of the extended gate lines arranged in odd-numbered rows are set to be in a sequentially connected state. After the array detection is completed, the connected ends of the gate lines arranged in odd-numbered rows are set to be in a disconnected state. As shown in FIG. 2, the ends of all of the gate lines arranged in odd-numbered rows are connected in sequence one by one. Although the row spacings of the gate lines are unequal, after the ends of all of the gate lines arranged in odd-numbered rows are connected in sequence one by one, the resistance of a gate line arranged in odd-numbered row and that of a gate line arranged in even-numbered row are different. When performing array detection on gate lines, the admittance or resistance of the detected gate line is obtained by detecting the terminal voltage and current of the gate line. The gate lines arranged in odd-numbered rows are in a connected state during array detection, and the terminal voltage and resistance of a gate line arranged in odd-numbered row are different from the terminal voltage and resistance of a gate line arranged in even-numbered row respectively. During array detection, the gate line arranged in odd-numbered row and the gate line arranged in even-numbered row are distinguished according to the difference in resistance, and it is determined whether there is a short-circuit fault or an open-circuit fault in the gate line arranged in a certain row according to the terminal voltage and current of the gate line obtained by scanning. As shown in FIG. 3, after the array detection is completed, the sequentially connected ends of the gate lines arranged in odd-numbered rows are directly cut off by a laser, so as to restore the display panel to a normal operating state. Since the gate lines arranged in odd-numbered rows are connected in sequence one by one, the normal operation of array detection is realized, avoiding that the array detection cannot be performed due to the row spacing of the gate lines, thereby improving the production yield of the display panel.

Figure 4:
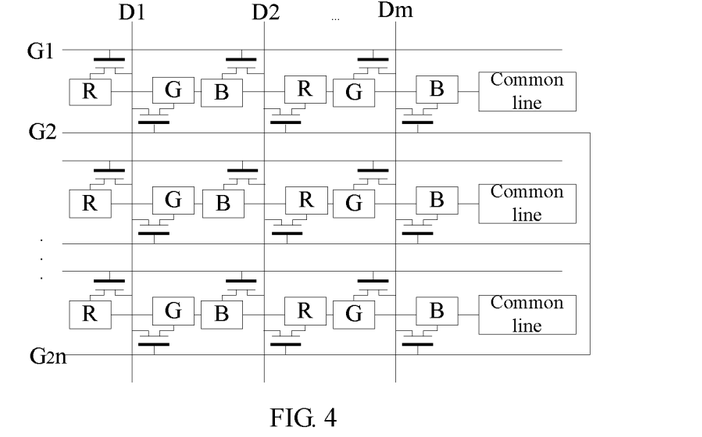
FIG. 4 is a schematic diagram showing another specific structure of a display panel according to an embodiment of the present application.
Figure 5:
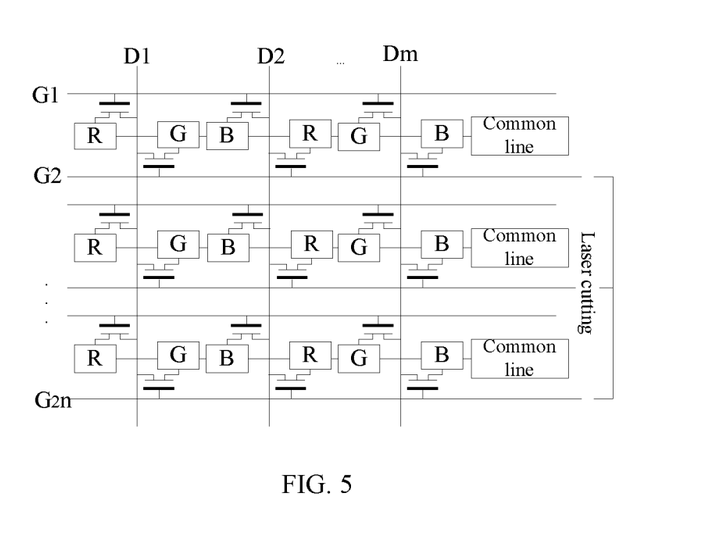
FIG. 5 is a schematic diagram showing another specific structure of a display panel according to an embodiment of the present application.

In an embodiment, the second portion of each of the gate lines arranged in even-numbered rows is extended by a second distance. Before array detection, the ends of the extended gate lines arranged in even-numbered rows are set to be in a sequentially connected state. After the array detection is completed, the connected ends of the gate lines arranged in even-numbered rows are set to be in a disconnected state. As shown in FIG. 4, the ends of all of the gate lines arranged in even-numbered rows are connected in sequence one by one. Although the row spacings of the gate lines are unequal, after the ends of all of the gate lines arranged in even-numbered rows are connected in sequence one by one, the resistance of a gate line arranged in odd-numbered row and that of a gate line arranged in even-numbered row are different. When performing array detection on gate lines, the admittance or resistance of the detected gate line is obtained by detecting the terminal voltage and current of the gate line. The gate lines arranged in even-numbered rows are in a connected state during array detection, and the terminal voltage and resistance of a gate line arranged in odd-numbered row are different from the terminal voltage and resistance of a gate line arranged in even-numbered row respectively. During array detection, the gate line arranged in odd-numbered row and the gate line arranged in even-numbered row are distinguished according to the difference in resistance, and it is determined whether there is a short-circuit fault or an open-circuit fault in the gate line arranged in a certain row according to the terminal voltage and current of the gate line obtained by scanning. As shown in FIG. 5, after the array detection is completed, the sequentially connected ends of the gate lines arranged in even-numbered rows are directly cut off by a laser, so as to restore the display panel to a normal operating state. Since the second portion of each of the gate lines arranged in even-numbered rows is extended by a second distance, and the extended ends of the gate lines arranged in even-numbered rows are connected in sequence one by one, the normal operation of array detection is realized, avoiding that the array detection will be impossible due to the unequal row spacings of the gate lines, thereby improving the production yield of the display panel.

Figure 6:
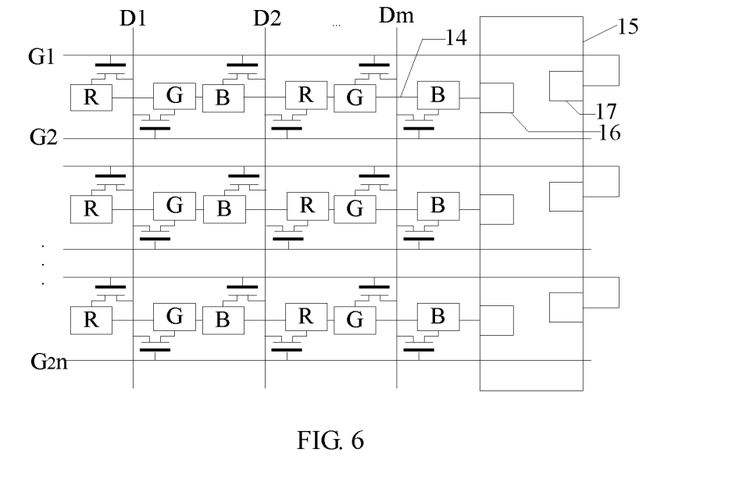
FIG. 6 is a schematic diagram showing a structure of another display panel according to an embodiment of the present application.
Figure 7:
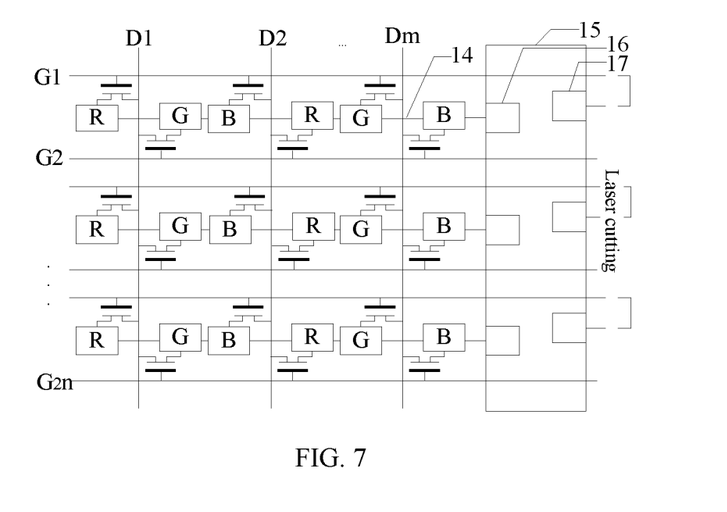
FIG. 7 is a schematic diagram showing a structure of another display panel according to an embodiment of the present application.

FIG. 6 and FIG. 7 are schematic diagrams showing a structure of another display panel according to an embodiment of the present application. For convenience of description, only the portions related to the embodiment of the present application are shown.

In an embodiment, as shown in FIG. 6, in the display panel, 2n gate lines correspond to n rows of pixels, and m data lines correspond to 2m columns of subpixels. The display panel further includes first reference voltage lines 14 and second reference voltage lines 15. A first reference voltage line is arranged between two gate lines corresponding to each row of pixels, and each row of pixels is correspondingly connected to one of the first reference voltage lines. The ends of the first reference voltage lines are parallel to the gate lines. The first reference voltage line corresponding to each row of pixels is connected to liquid crystal capacitors and storage capacitors of the row of pixels, such that each row of pixels is charged with voltage and kept until the next screen update. An end of the first reference voltage line corresponding to each row of pixels is connected to a corresponding second reference voltage line through a welding point 16. The second reference voltage line is arranged perpendicular to the first reference voltage lines and is arranged on a side of the pixel array.

As shown in the figure, the ends of the gate lines arranged in odd-numbered rows extend a predetermined distance and are connected to a corresponding second reference voltage line through welding points 17. By extending the end of each of the gate lines arranged in odd-numbered rows by a predetermined distance, and setting vias on the display panel, the gate lines arranged in odd-numbered rows pass through the vias and are connected to the second reference voltage line. If the second reference voltage line is double-layered trace, there is no need to provide vias, and the gate lines arranged in odd-numbered rows can be directly connected to the second reference voltage line through the welding points 17.

In an embodiment, before array detection, the gate lines arranged in odd-numbered rows and the second reference voltage line are set to be in a connected state, and after the array detection is completed, the gate lines arranged in odd-numbered rows and the second reference voltage line are set to be in a disconnected state. An end of each of the gate lines arranged in odd-numbered rows is connected to the second reference voltage line, such that there is a difference in resistance between the gate lines of the odd-numbered rows and the gate lines arranged in even-numbered rows. When performing array detection on the display panel, the gate line arranged in even-numbered row and the gate line arranged in odd-numbered row are distinguished according to the difference in resistance. It is determined whether the detected gate line is short-circuited or open according to the detected terminal voltage and current of the gate line, so as to realize the array detection for display panel, thereby improving the production yield of the display panel. As shown in FIG. 7, the ends of the first reference voltage lines 14 are connected to the corresponding second reference voltage line 15 through welding points 16, and the ends of the gate lines arranged in odd-numbered rows extend a predetermined distance and are connected to the corresponding second reference voltage line 15 through welding points 17. After the array detection is completed, the ends of the gate lines arranged in odd-numbered rows connected to the second reference voltage line 15 can be directly cut off by a laser, so as to restore the display panel to a normal operating state.

Figure 8:
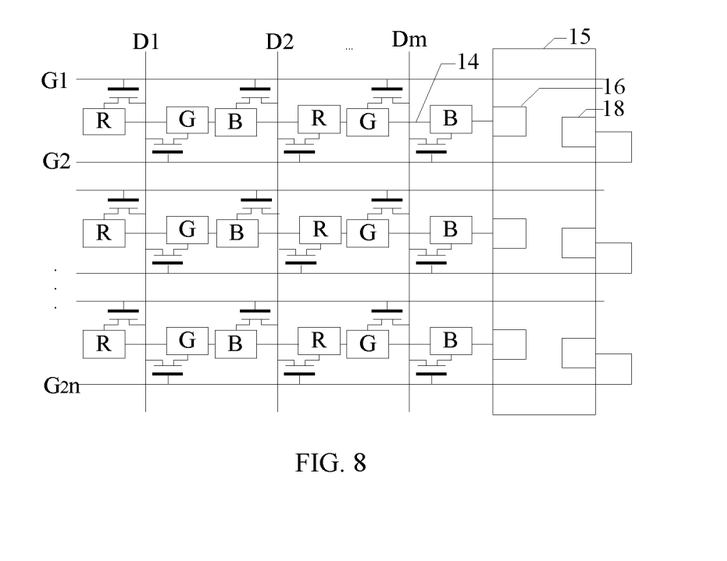
FIG. 8 is a schematic diagram showing a specific structure of another display panel according to an embodiment of the present application.
Figure 9:
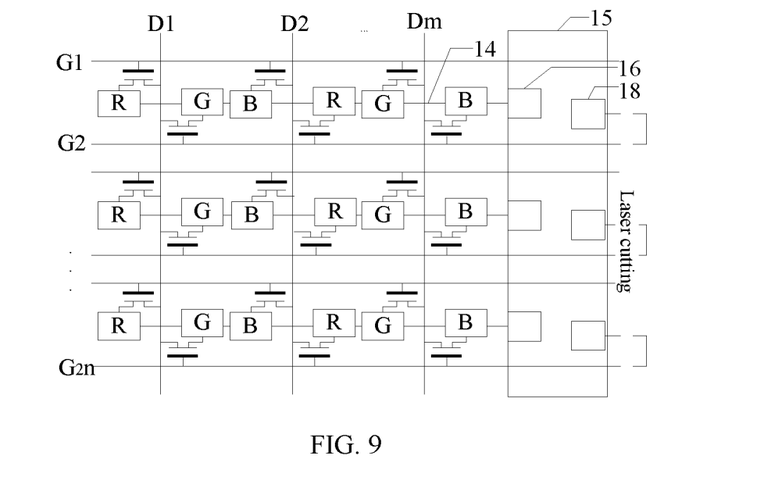
FIG. 9 is a schematic diagram showing a specific structure of another display panel according to an embodiment of the present application.

FIG. 8 and FIG. 9 are schematic diagrams showing another structure of another display panel according to an embodiment of the present application. For convenience of description, only the portions related to the embodiment of the present application are shown.

In an embodiment, as shown in FIG. 8, in the display panel, 2n gate lines correspond to n rows of pixels, and m data lines correspond to 2m columns of subpixels. The display panel further includes first reference voltage lines 14 and second reference voltage lines 15. A first reference voltage line 14 is arranged between two gate lines corresponding to each row of pixels, and each row of pixels is correspondingly connected to one of the first reference voltage lines 14. The end of any first reference voltage line is parallel to any gate line. The end of any first reference voltage line is connected to the corresponding second reference voltage line through a welding point 16. The second reference voltage line is arranged perpendicular to the first reference voltage lines and is arranged on a side of the pixel array.

As shown in the figure, the ends of the gate lines arranged in even-numbered rows extend a predetermined distance and are connected to a corresponding second reference voltage line through welding points 18. By extending the end of each of the gate lines arranged in even-numbered rows by a predetermined distance, and setting vias on the display panel, the gate lines arranged in even-numbered rows pass through the vias and are connected to the second reference voltage line. If the second reference voltage line is double-layered trace, there is no need to provide vias, and the gate lines arranged in even-numbered rows can be directly connected to the second reference voltage line through the welding points 17.

In an embodiment, before array detection, the gate lines arranged in even-numbered rows and the second reference voltage line are set to be in a connected state, and after the array detection is completed, the gate lines arranged in even-numbered rows and the second reference voltage line are set to be in a disconnected state. An end of each of the gate lines arranged in even-numbered rows is connected to the second reference voltage line, such that there is a difference in resistance between the gate lines of the even-numbered rows and the gate lines arranged in odd-numbered rows. When performing array detection on the display panel, the gate line arranged in even-numbered row and the gate line arranged in even-numbered row are distinguished according to the difference in resistance. It is determined whether the detected gate line is short-circuited or open according to the detected terminal voltage and current of the gate line, so as to realize the array detection for display panel, thereby improving the production yield of the display panel. As shown in FIG. 9, the ends of the first reference voltage lines 14 are connected to the corresponding second reference voltage line 15 through welding points 16, and the ends of the gate lines arranged in even-numbered rows extend a predetermined distance and are connected to the corresponding second reference voltage line 15 through welding points 18. After the array detection is completed, the ends of the gate lines arranged in even-numbered rows connected to the second reference voltage line can be directly cut off by a laser, so as to restore the display panel to a normal operating state.

Figure 10:
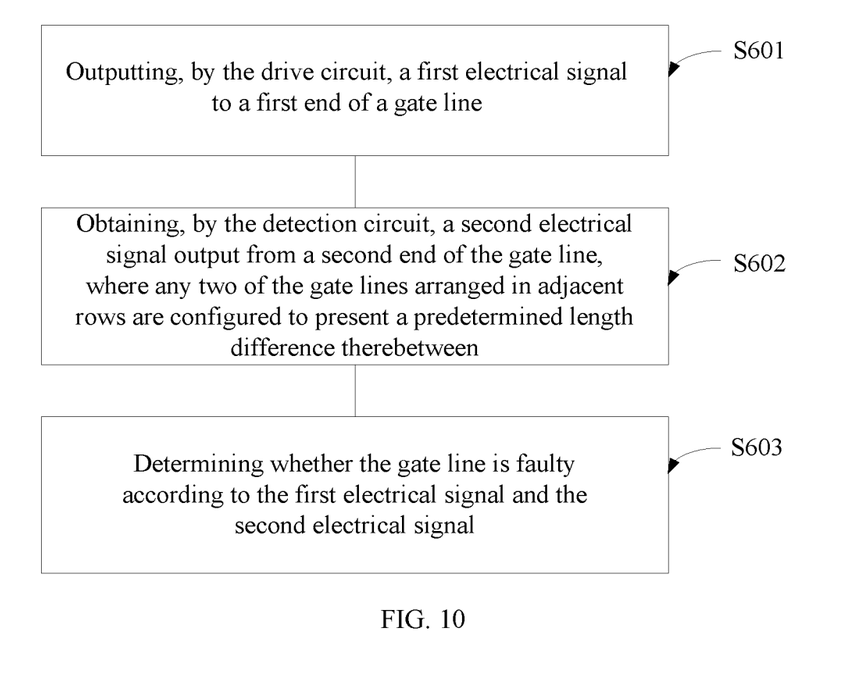
FIG. 10 is a schematic diagram showing an implementing process of a detection method for a display panel according to an embodiment of the present application.

As shown in FIG. 10, it is a schematic diagram showing the implementing process of a detection method for a display panel according to an embodiment of the present application. The detection method detects the state of the gate lines by a drive circuit and a detection circuit, the drive circuit is connected to the display panel, and the detection circuit is connected to the display panel, the detection method may include the following steps: step S601, outputting, by the drive circuit, a first electrical signal to a first end of a gate line; step S602, obtaining, by the detection circuit, a second electrical signal output from a second end of the gate line, where any two of the gate lines arranged in adjacent rows are configured to present a predetermined length difference therebetween; setting second ends of the gate lines arranged in even-numbered rows to be in a connected state, and setting second ends of the gate lines arranged in odd-numbered rows to be in a normal operating wiring state; or setting the second ends of the gate lines arranged in odd-numbered rows to be in a connected state, and setting the second ends of the gate lines arranged in even-numbered rows to be in a normal operating wiring state; step S603, determining whether the gate line is faulty according to the first electrical signal and the second electrical signal.

In this embodiment, the first end of the gate line is an end of the detection terminal that receives the drive signal, and the first end is away from the scanning detection, so as to receive the electrical signal output by the drive circuit; the first electrical signal is a voltage signal.

The second end of the gate line is an end scanned and detected by the detection circuit. The second electrical signal includes the output terminal voltage and current signal. Due to the predetermined length difference between two gate lines arranged in adjacent rows, the ends of the gate lines arranged in odd-numbered rows are extended and connected, such that the resistance of the gate line arranged in odd-numbered row is different from that of the gate line arranged in even-numbered row. When the detection circuit scans the ends of the gate lines for array detection, the terminal voltages and currents of the gate lines arranged in odd-numbered rows are different from those of the gate lines arranged in even-numbered rows, and the faults of the gate lines arranged in odd-numbered rows and the gate lines arranged in even-numbered rows are respectively detected according to the resistance difference of the gate lines.

In order to ensure that the results of the whole process of the display panel are within the control range, and to avoid the appearance of unqualified products, the corresponding engineering inspections are carried out after the wiring process of the pixel array of the panel is completed, and the short-circuit or open-circuit detection for the array of the display panel is carried out. The drive circuit outputs the first electrical signals to the first ends of the gate lines row by row at a predetermined speed; the first electrical signal may be an AC voltage signal, the AC voltage signal is applied to the first end of the gate line of the panel, and a second electrical signal is generated at the other end of the gate line; and the first end may be an end where the end points of the gate lines are aligned. The detection circuit scans the second ends of the gate lines row by row at the same predetermined speed, and obtains the second electrical signal through the sensor, where the second electrical signal is the terminal voltage and current signal of the gate line. By processing the terminal voltage and current signal with the microprocessor in the detection circuit, it is determined whether the detected gate line has a short-circuit fault or an open-circuit fault, for example, if the voltage of the second electrical signal is too low or the voltage signal cannot be detected, it is detected as an open circuit, and if the current of the second electrical signal is too high, it is detected as a short circuit. By detecting the short circuit and open circuit of the gate lines in the display panel, the production yield of the display panel is improved.

In an embodiment, the detection method further includes: before array detection, second ends of the gate lines arranged in even-numbered rows is set to be in a connected state, and second ends of the gate lines arranged in odd-numbered rows is set to be in a normal operating wiring state, alternatively, the second ends of the gate lines arranged in odd-numbered rows is set to be in a connected state, and the second ends of the gate lines arranged in even-numbered rows is set to be in a normal operating wiring state, such that a resistance of each of the gate lines arranged in even-numbered rows and that of each of the gate lines arranged in odd-numbered rows is different. During array detection, the resistance of each of the gate lines arranged in odd-numbered rows and that of each of the gate lines arranged in even-numbered rows are respectively obtained according to the first electrical signal and the second electrical signal, and a fault of the gate lines arranged in odd-numbered rows and that of the gate lines arranged in even-numbered rows are determined according to the resistances.

In an embodiment, the detection method further includes: when second ends of the gate lines arranged in odd-numbered rows are in a connected state, the second ends of the gate lines are scanned to detect terminal voltages and currents of the gate lines arranged in even-numbered rows and those of the gate lines arranged in odd-numbered rows respectively, a path condition of each of the gate lines arranged in even-numbered rows is detected according to the terminal voltage and the current of each of the gate lines arranged in even-numbered rows, and a path condition of each of the gate lines arranged in odd-numbered rows is detected according to the terminal voltage and the current of each of the gate lines arranged in odd-numbered rows.

In an embodiment, the detection method further includes: when second ends of the gate lines arranged in even-numbered rows are in a connected state, the second ends of the gate lines are scanned to detect terminal voltages and currents of the gate lines arranged in even-numbered rows and those of the gate lines arranged in odd-numbered rows respectively, a path condition of each of the gate lines arranged in even-numbered rows is detected according to the terminal voltage and the current of each of the gate lines arranged in even-numbered rows, and a path condition of each of the gate lines arranged in odd-numbered rows is detected according to the terminal voltage and the current of each of the gate lines arranged in odd-numbered rows.

In an embodiment, the detection method further includes: before fault detection for gate lines, the ends of the gate lines arranged in odd-numbered rows are connected in sequence one by one; and after the fault detection for gate lines is completed, the ends of the gate lines arranged in odd-numbered rows are disconnected.

In an embodiment, the detection method further includes: before fault detection for gate lines, the ends of the gate lines arranged in even-numbered rows are connected in sequence one by one; and after the fault detection for gate lines is completed, the ends of the gate lines arranged in even-numbered rows are disconnected.

In an embodiment, the detection method further includes: before array detection, the second end of each of the gate lines arranged in odd-numbered rows is extended by a predetermined distance, the end of which and the second reference voltage line are set to be in a connected state, and the second end of each of the gate lines arranged in even-numbered rows is set to be in a normal operating wiring state; or the second end of each of the gate lines arranged in even-numbered rows is extended by a predetermined distance, the end of which and the second reference voltage line are set to be in a connected state, and the second end of each of the gate lines arranged in odd-numbered rows is set to be in a normal operating wiring state, such that a resistance of each of the gate lines arranged in even-numbered rows and that of each of the gate lines arranged in odd-numbered rows is different. During array detection, the resistance of each of the gate lines is determined according to the first electrical signal and the second electrical signal, so as to distinguish the gate lines arranged in even-numbered rows and the gate lines arranged in odd-numbered rows according to the resistances.

In an embodiment, the detection method further includes: before fault detection for gate lines and first reference voltage lines, the end of each of the gate lines arranged in odd-numbered rows is extended by a predetermined distance and is connected to a corresponding second reference voltage line. After the fault detection for gate lines and first reference voltage lines is completed, the ends of the gate lines arranged in odd-numbered rows are disconnected from the corresponding second reference voltage line.

In an embodiment, the detection method further includes: before fault detection for gate lines and first reference voltage lines, the end of each of the gate lines arranged in even-numbered rows is extended by a predetermined distance and is connected to a corresponding second reference voltage line. After the fault detection for gate lines and first reference voltage lines is completed, the ends of the gate lines arranged in even-numbered rows from are disconnected the corresponding second reference voltage line.

It should be noted that within the technical scope disclosed in the present application, those of ordinary skill in the art can easily conceive that other ranking schemes should also be within the protection scope of the present application, which will not be repeated here.

It should be understood that the sequence number of each step in the foregoing embodiments does not mean the order of execution, and the execution order of each process shall be determined by its function and internal logic, and shall not constitute any limitation to the implementing process of the embodiments of the present application.

Figure 11:
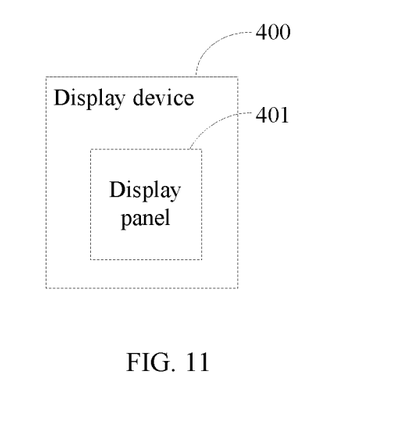
FIG. 11 is a schematic diagram showing a structure of a display device according to an embodiment of the present application.

As shown in FIG. 11, it is a schematic diagram showing a structure of a display device according to an embodiment of the present application. For convenience of description, only the portions related to the embodiment of the present application are shown. The display device 400 includes a display panel 401, the display panel 401 includes: a pixel array, a plurality of gate lines arranged in rows, and a plurality of data lines arranged in columns, where the gate lines and the data lines are configured to intersect each other at right angles, respectively; each row of pixels is correspondingly connected to two of the gate lines, and any two of the gate lines are parallel to each other; every two columns of subpixels are correspondingly connected to one of the data lines, and any two of the data lines are parallel to each other; and any two of the gate lines arranged in adjacent rows are configured to present a predetermined length difference therebetween.

In this embodiment, the display panel can be any type of display panel, for example, a liquid crystal display panel based on LCD (Liquid Crystal Display) technology, an organic electroluminescence display panel based on OLED (Organic Light-Emitting Diode) technology, a quantum dot light-emitting diode display panel or curved display panel based on QLED (Quantum Dot Light-Emitting Diodes) technology, etc.

The above are only optional embodiments of the present application, and are not intended to limit the present application. For those of ordinary skill in the art, the present application can have various modifications and changes. Any modifications, equivalent replacements, and improvements made within the spirit and principle of the present application shall be included in the scope of the claims of the present application.

What is claimed is:

1. A display panel, comprising:
   a pixel array comprising pixels arranged in rows and in columns, wherein each of the pixels comprises three subpixels arranged in sequence along a row direction;
   a plurality of gate lines arranged in rows, wherein each row of pixels is connected to two of the gate lines, wherein any two of the gate lines are parallel to each other, wherein any two of the gate lines arranged in adjacent rows are configured to present a predetermined length difference therebetween, wherein a portion of each of the gate lines is set to be a first portion, wherein the first portion is connected to each row of pixels, wherein an end of each of the gate lines configured for array detection is set to be a second portion, wherein a length of the first portion of each of the gate lines arranged in even-numbered rows is equal to that of the first portion of each of the gate lines arranged in odd-numbered rows, wherein the second portion of each of the gate lines arranged in odd-numbered rows is set to extend by a first distance, wherein the second portion of each of the gate lines arranged in odd-numbered rows is extended by a first distance, wherein before array detection, ends of extended gate lines arranged in odd-numbered rows are set to be in a sequentially connected state, and wherein after the array detection is completed, connected ends of the gate lines arranged in odd-numbered rows are set to be in a disconnected state; and
   a plurality of data lines arranged in columns, wherein the gate lines and the data lines are configured to intersect each other at right angles, wherein every two columns of subpixels are connected to one of the data lines, and wherein any two of the data lines are parallel to each other.

2. The display panel according to claim 1, wherein a row spacing of two adjacent gate lines connected to a same row of pixels is set to be a first row spacing, wherein a row spacing of two adjacent gate lines connected to different rows of pixels is set to be a second row spacing, and wherein the first row spacing is greater than the second row spacing.

3. The display panel according to claim 1, wherein a length of each of the gate lines arranged in odd-numbered rows is set to be a first length, wherein a length of each of the gate lines arranged in even-numbered rows is set to be a second length, and wherein the first length is set to be greater than the second length.

4. The display panel according to claim 1, wherein a length of each of the gate lines arranged in odd-numbered rows is set to be a first length, wherein a length of each of the gate lines arranged in even-numbered rows is set to be a second length, and wherein the first length is set to be smaller than the second length.

5. The display panel according to claim 1, wherein ends of all of the gate lines arranged in odd-numbered rows are connected in sequence one by one, or wherein ends of all of the gate lines arranged in even-numbered rows are connected in sequence one by one.

6. A display device, comprising:
   a display panel comprising:
      a pixel array;
      a plurality of gate lines arranged in rows, wherein each row of pixels is connected to two of the gate lines, wherein any two of the gate lines are parallel to each other, wherein any two of the gate lines arranged in adjacent rows are configured to present a predetermined length difference therebetween, wherein a portion of each of the gate lines is set to be a first portion, wherein the first portion is connected to each row of pixels, wherein an end of each of the gate lines configured for array detection is set to be a second portion, wherein a length of the first portion of each of the gate lines arranged in even-numbered rows is equal to that of the first portion of each of the gate lines arranged in odd-numbered rows, wherein the second portion of each of the gate lines arranged in odd-numbered rows is set to extend by a first distance, wherein the second portion of each of the gate lines arranged in odd-numbered rows is extended by a first distance, wherein before array detection, ends of extended gate lines arranged in odd-numbered rows are set to be in a sequentially connected state, and wherein after the array detection is completed, connected ends of the gate lines arranged in odd-numbered rows are set to be in a disconnected state; and
      a plurality of data lines arranged in columns, wherein the gate lines and the data lines are configured to intersect each other at right angles, and wherein every two columns of subpixels are correspondingly connected to one of the data lines, and any two of the data lines are parallel to each other.

7. The display device according to claim 6, wherein a row spacing of two adjacent gate lines connected to a same row of pixels is set to be a first row spacing, wherein a row spacing of two adjacent gate lines connected to different rows of pixels is set to be a second row spacing, and wherein the first row spacing is greater than the second row spacing.

8. The display device according to claim 6, wherein a length of each of the gate lines arranged in odd-numbered rows is set to be a first length, wherein a length of each of the gate lines arranged in even-numbered rows is set to be a second length, and wherein the first length is set to be greater than the second length.

9. The display device according to claim 6, wherein a length of each of the gate lines arranged in odd-numbered rows is set to be a first length, wherein a length of each of the gate lines arranged in even-numbered rows is set to be a second length, and wherein the first length is set to be smaller than the second length.

10. The display device according to claim 6, wherein ends of all of the gate lines arranged in odd-numbered rows are connected in sequence one by one, or wherein ends of all of the gate lines arranged in even-numbered rows are connected in sequence one by one.

11. A display panel, comprising:
a pixel array comprising pixels arranged in rows and in columns, wherein each of the pixels comprises three subpixels arranged in sequence along a row direction;
a plurality of gate lines arranged in rows, wherein each row of pixels is connected to two of the gate lines, wherein any two of the gate lines are parallel to each other, wherein any two of the gate lines arranged in adjacent rows are configured to present a predetermined length difference therebetween, wherein a portion of each of the gate lines is set to be a first portion, wherein the first portion is connected to each row of pixels, wherein an end of each of the gate lines configured for array detection is set to be a second portion, wherein a length of the first portion of each of the gate lines arranged in even-numbered rows is equal to that of the first portion of each of the gate lines arranged in odd-numbered rows, wherein the second portion of each of the gate lines arranged in even-numbered rows is set to extend by a second distance, wherein the second portion of each of gate lines arranged in even-numbered rows is extended by a second distance, wherein before array detection, ends of extended gate lines arranged in even-numbered rows are set to be in a sequentially connected state, and wherein after the array detection is completed, connected ends of the gate lines arranged in even-numbered rows are set to be in a disconnected state; and
a plurality of data lines arranged in columns, wherein the gate lines and the data lines are configured to intersect each other at right angles, wherein every two columns of subpixels are connected to one of the data lines, and wherein any two of the data lines are parallel to each other.

12. The display panel according to claim 11, wherein a row spacing of two adjacent gate lines connected to a same row of pixels is set to be a first row spacing, wherein a row spacing of two adjacent gate lines connected to different rows of pixels is set to be a second row spacing, and wherein the first row spacing is greater than the second row spacing.

13. The display panel according to claim 11, wherein a length of each of the gate lines arranged in odd-numbered rows is set to be a first length, wherein a length of each of the gate lines arranged in even-numbered rows is set to be a second length, and wherein the first length is set to be greater than the second length.

14. The display panel according to claim 11, wherein a length of each of the gate lines arranged in odd-numbered rows is set to be a first length, wherein a length of each of the gate lines arranged in even-numbered rows is set to be a second length, and wherein the first length is set to be smaller than the second length.

15. The display panel according to claim 11, wherein ends of all of the gate lines arranged in odd-numbered rows are connected in sequence one by one, or wherein ends of all of the gate lines arranged in even-numbered rows are connected in sequence one by one.

* * * * *

UNITED STATES PATENT AND TRADEMARK OFFICE
CERTIFICATE OF CORRECTION

| | |
|---|---|
| PATENT NO. | : 11,361,697 B2 |
| APPLICATION NO. | : 17/272602 |
| DATED | : June 14, 2022 |
| INVENTOR(S) | : Chuan Wu |

Page 1 of 1

It is certified that error appears in the above-identified patent and that said Letters Patent is hereby corrected as shown below:

On the Title Page

Item (73), Assignee add:
--HKC Corporation Limited, Guangdong, China
Chongqing HKC Optoelectronics Technology Co., Ltd., Chongqing, China--

Signed and Sealed this
Thirty-first Day of December, 2024

Derrick Brent
*Acting Director of the United States Patent and Trademark Office*